(No Model.)

C. E. JENKINS.
NUT LOCK.

No. 409,204. Patented Aug. 20, 1889.

Witnesses
Wm A. Skinkle.
Chas E Gorton.

Inventor
Charles E. Jenkins
By his Attorneys
Parkinson & Parkinson

UNITED STATES PATENT OFFICE.

CHARLES E. JENKINS, OF JANESVILLE, WISCONSIN.

NUT-LOCK.

SPECIFICATION forming part of Letters Patent No. 409,204, dated August 20, 1889.

Application filed July 19, 1888. Serial No. 280,406. (No model.)

*To all whom it may concern:*

Be it known that I, CHARLES E. JENKINS, a citizen of the United States, residing at Janesville, in the county of Rock and State of Wisconsin, have invented certain new and useful Improvements in the Method of Locking Nuts to Bolts, of which the following is a specification.

The object of my invention is obtain a nut-lock permanent and fixed in position so long as it is intentionally left in place, but which may be readily unlocked to enable the nut to be removed and applied to another bolt, or nut and bolt both applied in a different position, when the lock may be re-engaged; and it consists in the employment of a nut having a bore or bores through its side practically perpendicular to the axis of the bolt, and a hardened and pointed steel pin of slightly greater diameter than the lateral bore, and of greater length than the thickness of the nut, so that it may be driven through said nut and into the bolt, penetrating some distance therein and projecting beyond the side of the nut, so that it may be drawn out by means of a claw-hammer or nippers when it is desired to disengage the nut, but will be held permanently in place, locking the nut to the bolt by its friction and wedging contact with the bore, into which it has been driven, so long as the lock is to continue.

Figure 1:
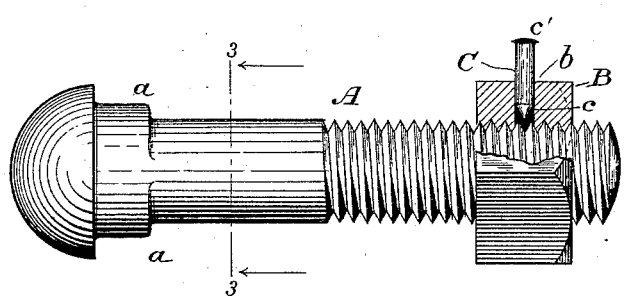
Figure 3:
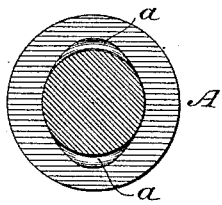
Figure 2:
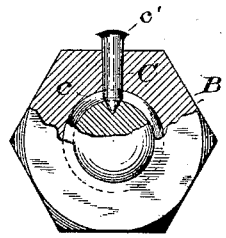

In the drawings, Figure 1 is a side elevation of a bolt and nut-lock embodying my invention, the nut being partly broken away to more clearly expose the construction. Fig. 2 is an end elevation, the nut also being partly broken away; and Fig. 3 is a section on the correspondingly-numbered line, looking in the direction indicated by arrows.

A represents a bolt of any desired construction, advisably having wings *a* upon its shank to engage with a suitably-shaped socket and thereby be prevented from turning.

B is a nut adapted to screw upon said bolt and having one or more lateral bores or apertures *b* passing through its sides in a direction practically perpendicular with the axis of the bolt, and C is a hardened steel pin pointed, as at *c*, and of somewhat greater length than the thickness of the walls of the nut, and of slightly greater diameter than the bores in the sides of said nut, so that when driven into one of these bores it may wedge firmly therein, while its pointed end penetrates the threads and spindle of the bolt and locks the nut against rotation thereon. The compression of the lateral bore into which this pin is driven will be sufficient to hold the pin against escape by jarring or otherwise, therefore causing the lock to be permanent until intentionally disturbed; but should it for any cause be desired to remove the nut the pin, projecting, as it does, beyond the sides of the latter, and headed, as at *c'*, may be drawn out by means of a claw-hammer or by nippers and thus break the lock. When the nut is replaced or put onto another bolt, the pin may be either driven into the same lateral aperture; or, if by repeated use this has become too large to grasp it firmly, it may be driven into one of the other apertures not until this time employed.

While I have described the locking-pin as of steel, it is evident that it may be formed of case-hardened iron or of any other metal of suitable density or incompressibility that will penetrate the spindle of the bolt and will wedge apart the walls of the bore into which it is driven.

I am aware that in Little's patent, granted December 6, 1881, a hole is formed in the side of the nut practically perpendicular to the axis of the bolt, and a short pin is driven below the face by means of a follower, which is then withdrawn and the body of the nut pounded down over the pin, thus permanently engaging it and making it impossible to remove it or to remove the nut without drilling out the hole or else destroying the bolt and nut for any future use; also, that in Bloom's patent, granted June 28, 1881, a hole is formed in the side of the nut and a punch driven in to spread the nut and then at once withdrawn; and also that in Goodrich's patent, granted November 3, 1885, a hole is made diagonally from the top or outer face of the nut and obliquely to the axis of the bolt, and a pin is then driven in, which strikes the thread of the screw at an angle, so that it is easily worked out, and neither of these constructions do I claim; but What I do claim, and desire to secure by Letters Patent, is—

A nut-lock consisting of a screw-threaded bolt, a nut having a bore through its sides practically perpendicular to the axis of the bolt; and a hardened steel pin, of slightly greater diameter than the diameter of the lateral bore, driven into said bore until its point penetrates the bolt and left with its head protruding beyond the nut.

CHARLES E. JENKINS.

Witnesses:
PLINY NORCROSS,
J. C. METCALF.